United States Patent [19]
Park

[11] Patent Number: 5,131,026
[45] Date of Patent: Jul. 14, 1992

[54] FACSIMILE SYSTEM HAVING AUTO-ANSWERING FUNCTION

[75] Inventor: Chang-Kyu Park, Buchun, Rep. of Korea

[73] Assignee: SamSung Electronics Co., Ltd., Suwon, Japan

[21] Appl. No.: 379,978

[22] Filed: Jul. 14, 1989

[30] Foreign Application Priority Data

May 31, 1989 [KR] Rep. of Korea .............. 7323[U]

[51] Int. Cl.⁵ ............... H04M 11/00; H04M 11/64
[52] U.S. Cl. ..................... 379/100; 379/67; 379/88; 379/102
[58] Field of Search .......... 379/67, 70, 74, 77, 379/79, 88, 93, 96–98, 100, 102, 104, 105

[56] References Cited

U.S. PATENT DOCUMENTS

| | | | |
|---|---|---|---|
| 4,584,434 | 4/1986 | Hashimoto | 379/100 |
| 4,773,080 | 9/1988 | Nakajima et al. | 379/100 |
| 4,794,637 | 12/1988 | Hashimoto | 379/100 |
| 4,800,439 | 1/1989 | Yoshino | 379/100 |
| 4,821,312 | 4/1989 | Horton et al. | 379/100 |
| 4,868,865 | 9/1989 | Ogawa et al. | 379/100 |
| 4,901,343 | 2/1990 | Yamaguchi | 379/100 |
| 4,910,764 | 5/1990 | Bowen | 379/100 |
| 4,974,253 | 11/1990 | Hashimoto | 379/100 |
| 5,014,296 | 5/1991 | Saigano | 379/100 |

FOREIGN PATENT DOCUMENTS

| | | | |
|---|---|---|---|
| 63-142759 | 6/1988 | Japan | 379/100 |
| 2166624 | 5/1986 | United Kingdom | 379/100 |

Primary Examiner—James L. Dwyer
Assistant Examiner—Wing F. Chan
Attorney, Agent, or Firm—Robert E. Bushnell

[57] ABSTRACT

A facsimile system capable of embodying an auto-answrring function by coupling an auto-answering machine therewith. The improved facsimile system and method can reduce auto-answering time by operating an auto-receiving mode, regardless of present mode, when a calling station FAX requests transmission of image data while a called station FAX is in a voice-answering mode. To achieve the objects, the inventive FAX system includes a telephone for performing the voice communication function through a first line and an image processing means for processing an image data from a second line, in which said FAX system comprises; an auto-answering machine, a hook-off detection coil, a hook-off detection switch, a control unit, a signal induction unit, a tone-detection unit, a dialing-detection unit, a ring-detection unit, an input/output unit, a relay driver, a set of switch means, a transformer means, a MODEM, and an image processor unit.

17 Claims, 4 Drawing Sheets

FACSIMILE SYSTEM HAVING AUTO-ANSWERING FUNCTION

BACKGROUND OF THE INVENTION

This invention relates to a facsimile system, and specifically to a facsimile system capable of embodying an auto-answering function by coupling an auto-answering machine therewith Generally, a facsimile system (hereinafter referred to as FAX) is connected to a telephone line, and able to transmit or receive an image data by using the FAX, while voice signals are transmitted or received through the telephone line. Operating modes of the FAX may be either a manual receiving mode or auto-receiving mode. In the manual receiving mode, by executing an off-hook operation for the telephone hand-set a communication path is set up, and the FAX is driven by turning "ON" the receive-mode switch device to receive the image data transmitted from the calling station FAX. On the other hand, in the auto-receiving mode, the communication path is already established and the system is switched to automatically drive the FAX.

Therefore, when the FAX operates in the auto-receiving mode, the telephone line merely performs the function of setting up the communication path for the FAX. This means that the voice communication path through the telephone line cannot be established when the calling station is an ordinary telephone subscriber. Therefore, the FAX and telephone functions cannot be implemented at the same time. To implement the FAX and telephone functions simultaneously, an auto-answering function, which is conventionally implemented using a semiconductor memory, must be added.

Figure 1:
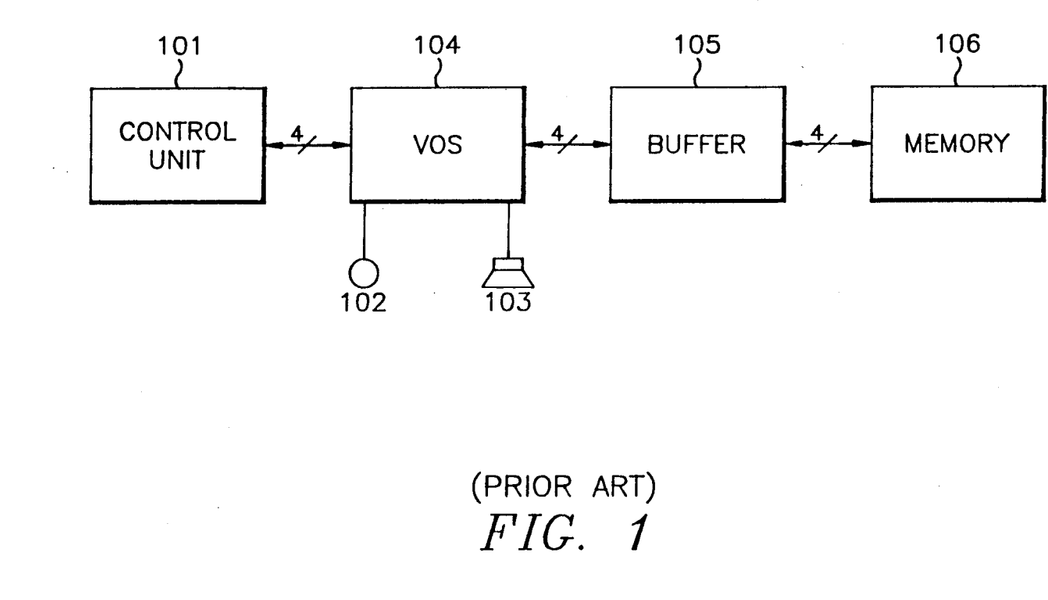
FIG. 1 shows a system block diagram of a prior art system.

FIG. 1 is a prior system block diagram of the voice answering function of the FAX, using a semiconductor memory device. The recording procedures for the voice information will be described first hereinafter. The control unit 101 of the FAX drives the voice synthesizer IC (VOS) 104 by a command from a keyboard, not shown here, to record the voice signal transmitted through a microphone means 102. The voice synthesizer IC 104 converts the analog voice signal generated from the microphone 102 to a digital signal, and applies it to a semiconductor memory 106 through a buffer means 105 for storage. For replaying the stored voice signal, the above-mentioned procedure should be executed in reverse order, and the voice information signal previously stored will be output through a loudspeaker means 103 or a telephone speaker. On the other hand, when the voice signal is stored in the semiconductor memory 106 by the above-mentioned auto-answering technique, the stored quantity or a recording time for the voice signal is restricted.

When the memory is full, the auto-answering function can be implemented only after resetting the system. If both the auto-receiving mode and the auto-answering mode are established at the same time, the FAX executes the auto-answering mode first, and after completing this function, the auto-receiving function will be performed. Therefore, the time required for the auto-answering mode cannot be reduced. Moreover, the voice quality is not high, since the auto-answering function is performed by using a semiconductor memory, and additional circuits are further required to drive the semiconductor memory device.

SUMMARY OF THE INVENTION

It is accordingly an object of this invention to provide a facsimile system capable of embodying an auto-answering function by coupling an auto-answering machine with the facsimile system.

It is another object of this invention to provide a facsimile system and a method for reducing auto-answering time by operating an auto-receiving mode, regardless of present mode, when a calling station FAX requests transmission of image data while a called station FAX is in a voice-answering mode.

It is still another object of this invention to provide a facsimile system and a method for facilitating extension of the stored quantity of voice signal when utilizing the voice-answering function of the FAX system.

To achieve these objects the inventive FAX system includes a telephone for performing the voice communication function through a first line and an image processing device for processing an image data from a second line, in which the FAX system comprises: an auto-answering machine connected to the first line which sends out answering information for a caller to select either the FAX function or the transmission function of the voice message, when a ring tone is detected; a control unit which analyzes the status of a first control signal through a third control signal to generate a fifth control signal, and controls overall operation of the FAX system; a switching unit driven by the fifth control signal of the control unit which switches the telephone line to the second line; a tone-detection unit which detects a calling tone passed through the first line from the calling station FAX to generate the first control signal; a dialing-detection unit which detects a dial signal passed through the first line for selecting the function of the FAX, thereby to generate the second control signal; and a ring signal detection unit which detects the ring signal from the first line when the auto-answering machine is turned off, thereby generating the third control signal.

Accordingly, another aspect of the invention, in which a telephone and an auto-answering machine are connected to the first line in parallel and an image processing device for processing an image data of the calling station FAX, comprises: a first step of assigning the FAX system to the auto-receiving mode and an auto-answering machine to the auto-answering mode, and initializing the system; a second step of operating the auto-answering machine to initiate the auto-answering function for informing the caller of a choice of the FAX function or the voice transmitting function when a ring signal is generated on the first line; a third step of switching the telephone line to the second line to process the received image data when the calling tone from the calling station FAX is detected during the auto-answering process; a fourth step of switching the telephone line to the second line to process the received image data when the dialing signal for selecting the function of the FAX is detected after the execution of the auto-answering process; and a fifth step of driving the auto-answering machine to record the received voice message when there is no dialing signal after the auto-answering process proceeds.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

The above and other objects of the present invention will now become more apparent from the following description of the preferred embodiments in conjunction with the accompanying drawings.

Figure 2:
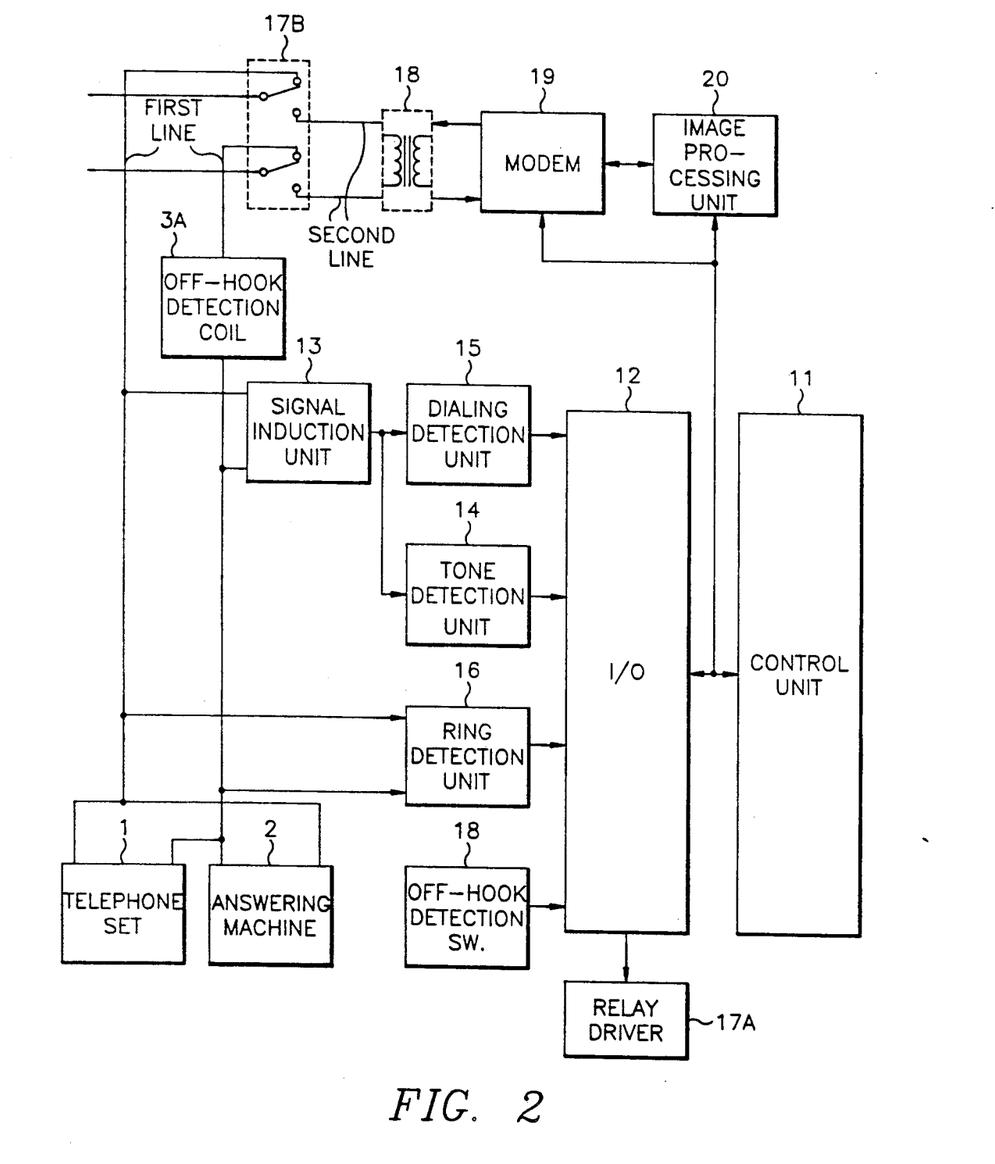
FIG. 2 shows a specific system block diagram according to the present invention.

Referring to FIG. 2, being a schematic block diagram according to the invention, the facsimile system comprises a telephone (TEL) 1, an auto-answering machine (ASM) 2, an off-hook detection coil (HOC) 3A, an off-hook detection switch (HOD) 3B, a control unit 11, a signal induction unit (SIU) 13, a tone-detection unit (TDU) 14, a dialing-detection unit (DDU) 15, a ring-detection unit (RDU) 16, an input/output unit (I/O) 12, a relay driver (RLD) 17A, a set of switch means 17B, a transformer means 18, a MODEM 19, and an image processor unit (IPU) 20.

According to FIG. 2, effects of each component are explained hereinbelow. The telephone 1 performs the voice communication unction through a first line. The auto-answering machine 2, connected to the first line in parallel with the telephone, performs the auto-answering function when a ring signal is detected. An off-hook detection device, composed of the off-hook detection coil 3A and the off-hook detection switch 3B, generates the fourth control signal when the telephone 1 is taken off-hook. The control unit 11 controls the overall operation of the FAX system and analyzes the status of the first control signal through the third control signal to generate a fifth control signal. The signal induction unit 13, connected to the first line in parallel, inducts an AC signal and compensates for a line-loss. The tone-detection unit 14 detects the calling tone from the output of the signal induction unit 13 and generates the first control signal. The dialing-detection unit 15 detects a dialing signal designated from the signal induction unit 13, for selecting the FAX system, and generates the second control signal. The ring-detection unit 16, connected to the first line in parallel, generates the third control signal when the ring signal is detected, while the auto-answering machine 2 is switched off. The input/output unit 12 inputs the first control signal through the fourth control signal to the control unit 11 sequentially under the control of the control unit 11 and outputs the fifth control signal of the control unit 11. A switching device, composed of the relay driver 17A and the switch 17B, is driven by the fifth control signal and performs the switching operation from the first line to the second line. An image processing device, composed of the transformer 18, the MODEM 19 and the image processor unit 20, processes the image data from the second line under the control of the control unit 11.

The preferred embodiment of the invention will now be described in detail on the basis of the above-mentioned configuration.

The first line, connected to the telephone 1, is connected in parallel to the auto-answering machine 2. If the telephone 1 is taken off-hook, a small current is induced in the off-hook detection coil 3A. This current operates the off-hook detection switch 3B and, as a result, the fourth control signal is applied to the input/output unit 12. Here, the control unit 11 acknowledges the induction of the fourth control signal, from the input/output unit 12, and puts the FAX in a stand-by state causing the FAX to be able to operate in transmission mode or copy mode.

Firstly, an operating procedure of the system under the condition that the telephone 1 is in an on-hook state, the automatic answering machine 2 is in voice answering mode and the FAX is in auto-receiving mode will be examined hereinafter with reference to the accompanying drawings.

The ring signal, when input through the telephone line connected to a switchboard (not shown), enters in the first line through the switch 17B. This ring-signal operates the auto-answering machine 12 and the outgoing message (hereinafter referred to as OGM) is output to the telephone line through the first line and the switch 17B.

The function of the OGM is to give the caller some instructions for leaving a message after hearing a beep tone when it is required to transmit a voice message, and/or or pressing a designated key when it is required to use the FAX function. If the calling station FAX is in a manual transmission mode, the caller hears the OGM and presses a corresponding key to transmit the image data. .Then the signal induction unit 13 eliminates the DC component of the key signal to convert it into a signal with an AC component only for induction. The converted signal is compensated for line loss and applied to the dialing detection unit 15 and the tone detection unit 14. Therefore, the tone detection unit 14 does not generate the detection signal since the dialing signal is input to the unit. Otherwise, the dialing detection unit 15 detects the dialing signal on the first line. Hence it detects a pulse signal or DTMF signal according to the calling station telephone, and generates the corresponding second control signal.

The control unit 11 outputs the decoding signal to the input/output unit 12 and sequentially analyzes the control signal input of the input/output unit 12. If the input/output unit 12 generates the second control signal by using the dialing detection unit 15, the control unit 11 acknowledges the second control signal to generate a fifth control signal.

The fifth control signal is applied to the relay driver 17A through the input/output unit 12 to drive the relay driver 17A, and the contact of switch 17B is switched to connect the telephone line to the second line. Therefore, if a called station identification (CED) is generated through the second line to indicate preparedness for receiving the image information, the calling station FAX starts to transmit the image information and the called station FAX receives the information through the second line for processing. Moreover, in the case that the calling station is a telephone subscriber and generates voice messages after hearing the beep tone, the auto-answering machine starts to operate, to record the messages on the ICM (Incoming Message) tape. Here the switch 17B continues to connect the telephone line to the first line.

Secondly, an operating procedure under the condition that the calling station FAX is in the automatic transmission mode will be described. In this case, if the calling station FAX performs automatic dialing, the auto-answering machine 2 will be operated by the ring signal. On the other hand, the calling station FAX in automatic transmission mode must send out a calling tone of 1100 Hz in accordance with the recommendation of the CCITT (International Telegraph and Telephone Consultative Committee). Therefore, this calling tone is applied to the signal induction unit 13 via the first line. The signal induction unit 13 induces an AC component signal with DC component eliminated, amplifies it, and applies it to the tone detection unit 14. The tone detection unit 14 detects the calling tone to output the first control signal to the input/output unit 12. The control unit 11 generates the fifth control signal in accordance with the first control signal transmitted through the input/output unit 12 and switches the switch 17B to the second line. The called station FAX generates the CED tone for transmission to the calling station FAX, and the calling station FAX starts to transmit the image data in accordance with the CED tone.

Thirdly, if the auto-answering machine is not in the answering mode but the FAX is in auto-receiving mode, the ring signal passed through the first line is applied to the input/output unit 12 via the ring detection unit 16. If the ring signal passes more than a given number of times through the ring detection unit 16, the control unit 11 acknowledges the presence of the fourth control signal and generates the fifth control signal.

Figure 3:
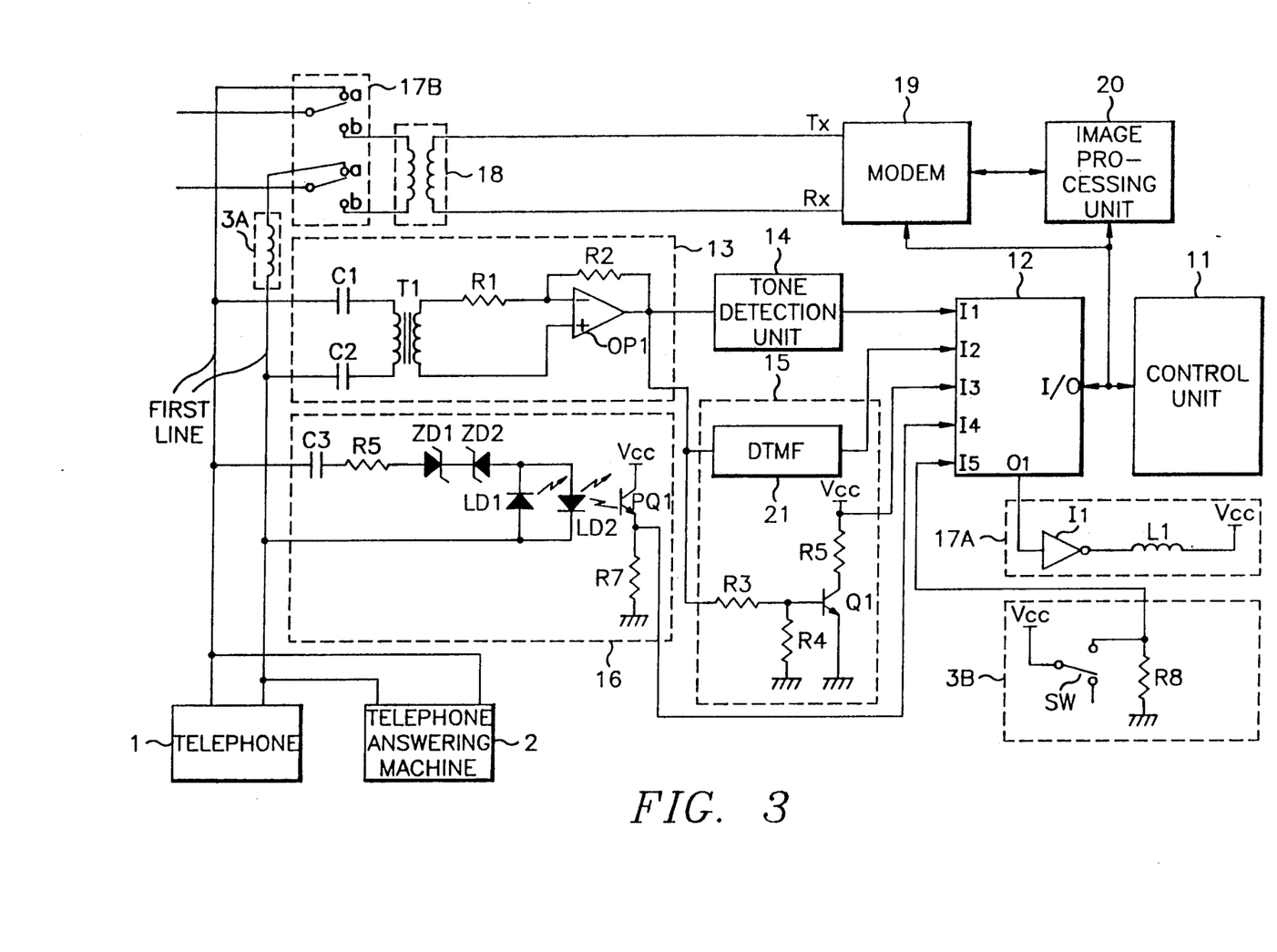
FIG. 3 shows specifically an operational diagram of the inventive auto-answering facsimile system.
Figure 4:
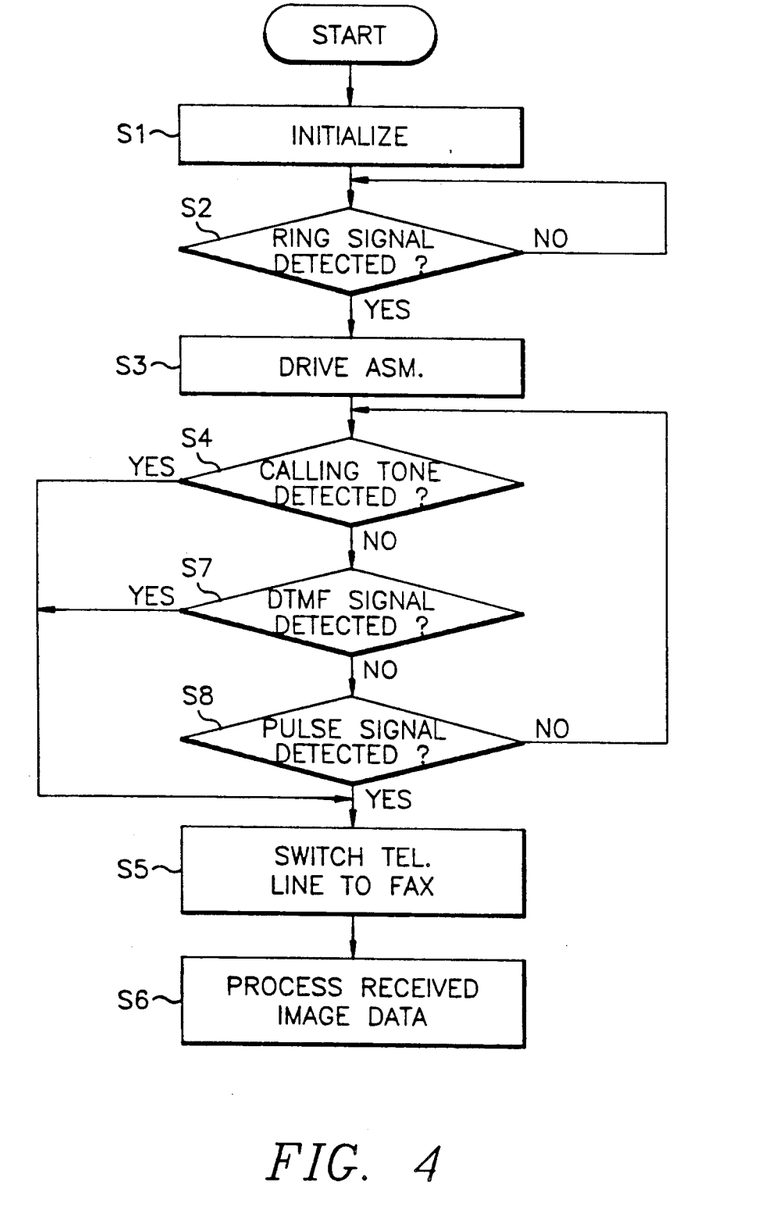
FIG. 4 shows a flow chart illustrating sequentially the operational process according to the present invention.

FIG. 3 is a detailed circuit diagram of FIG. 2, and FIG. 4 is a flow chart to show the switching function to the auto-answering mode and the auto-receiving mode during the absence of the called party in accordance with the invention.

Firstly, there is explained the case where the auto-answering machine is in the voice answering mode and the called station FAX is in the auto-receiving mode, while the calling station FAX is in the automatic transmission mode.

Then the step S1 sets the auto-answering machine 2 to the voice answering mode, the FAX to the auto-receiving mode, and initializes the system. If the FAX is not in operating mode, the switch 17B is positioned at the contact "a" in order to connect the telephone line connected with the switchboard to the telephone 1 and the first line of the auto-answering machine 2. Thereafter, if the calling station FAX performs automatic dialing and the communication path between the calling and the called station is established, the ring signal generated from the switchboard is applied to the auto-answering machine 2 and the telephone 1 via the telephone line. Then at the step S2, the auto-answering machine 2 detects the ring signal from the telephone line and, at the step S3 it starts to transmit the OGM. At this time, the calling station FAX automatically generates the calling tone in accordance with the CCITT recommendation after the automatic dialing.

The calling tone generated by the calling station FAX is applied to the first line through the contact "a" of the switch 17B. The tone signal is accompanied by a −48V DC signal. Hence the coupling capacitors C1, C2 eliminate the −48V DC component and the signal with AC component only is induced from the primary coil to the secondary coil of the matching transformer T1. This matching transformer T1 of high-impedance 20K:20K is used to protect the telephone line against change of electrical characteristics thereof. The signal which is induced to the secondary coil of the matching transformer T1 is applied to the tone detection unit 14 and an A/D converter unit in the dialing detection unit 15. The tone detection unit 14 detects the 1100 Hz calling tone and applies the tone as the first control signal to the input/output unit 12. Therefore, the control unit 11 outputs the decoding signal to the input/output unit 12 to select the input/output port of the input/output unit 12 and, at a step S4, it acknowledges that the calling station FAX is going to transmit the image information by the acquisition of the calling tone transmitted through the tone detection unit 14 as the first control signal. Therefore, at the step S5, the control unit 11 outputs a logic "high" level of the fifth control signal to switch the telephone line from the first line to the second line by means of the first control signal.

The fifth control signal output from the input/output unit 12 is inverted to a logic "low" level by an invertor I1 for current drive in the relay driver 17A and, as a result, a current path for the supply voltage Vcc is established and current flows in the coil L1.

As a result, the contact of the switch 17B is switched from the position "a" to "b" to connect the telephone line to the second line. At this moment, the loop for the auto-answering machine 2 is cut off and the operation of the auto-answering machine is automatically suspended. Thereafter, the called station FAX generates the CED tone of 2100 Hz to transmit to the calling station FAX. At the step S6, the control unit 11 controls the MODEM 19 and the image processing unit 20 to process the image data transmitted from the calling station FAX.

Secondly, there is considered the case that the automatic answering machine is in voice answering mode and the FAX is in auto-receiving mode, while the calling station FAX is in manual transmission mode.

The user assigns the auto-answering unit 2 to the voice answering mode and the FAX to automatic receiving mode, and initializes the system at the step S1. In this case, as discussed above, the switch 17B is positioned at the contact "a" to connect the telephone line to the first line. Thereafter, if a dialing signal is generated by the calling station FAX, the ring signal generated from the switchboard is applied to the first line. The automatic answering machine 2, at the step S2, detects the ring signal. Therefore, at a step S3, the auto-answering machine 2 sends out the following OGM to the calling station:

"This is XXX. Nobody is available for your call right now. So, if you want to send some FAX data, press key "0" twice. Otherwise, if you want to send some messages, please leave your message after the beep tone."

The above OGM is output through the first line. After hearing the above OGM, the calling station can select the transmission of either message or FAX data by pressing the corresponding key.

The case that the FAX data is transmitted will be discussed first. In the above OGM, the key "0" is assumed for FAX data transmission. Any key can be used by modifying the system control software. The key signals are different from one another according to the kinds of calling station telephones. That is, a DTMF signal is generated for a MFC type telephone, and a pulse signal for a pulse-type telephone.

The key signals generated by the MFC telephone are DTMF signals. For the key "0", the high frequency tone is 1336 Hz and the low frequency tone is 941 Hz. The DTMF signals are applied to the signal induction unit 13 via the first line. The DTMF detector 21 detects the DTMF signals of 1336 Hz and 941 Hz, and applies them to the input/output unit 12 as the second control signal. Herein, the tone detection unit 14 and the DTMF detector 21 are IC's for tone decoding and can be implemented using "XR2211" ICs manufactured by "EXAR". At this time, the control unit 11 acknowledges the second control signal at a step S7 and generates the fifth control signal at a step S5.

After this, as detailed in the above, the relay driver 17A is driven to position the contact of switch 17A to "b" to open the loop for the auto-answering machine 2 and to switch the mechanism to the FAX. Therefore, the operation of the auto-answering machine 2 is suspended. At the step S6, the control unit 11 controls the MODEM 19 and image processing unit 20 to process the image data transmitted from the calling station FAX. If the calling station telephone is a pulse-type telephone, pressing the key "0" once generates ten pulses. Since the key is pressed twice, twenty pulses can be detected. The required procedures are discussed hereinbelow. The pulse dial signal applied to the first line is processed by the signal induction unit 13. This analog pulse signal is adjusted by the resistors R3, R4 and applied to the base of the transistor Q1.

During the period when the level of the pulse signal is logic "HIGH", the transistor Q1 is turned on, and the pulse signal which is applied the the input/output unit 12 is inverted. The control unit 11 periodically scans the data from the input/output unit 12 every 10 ms, and, thus, can accept 10×2=20 periodic pulses of key signals generated by the calling station.

The control unit 11, at the step S8, acknowledges the pulse signal as the second control signal and generates the fifth control signal in accordance with the second control signal at the step S5. Then the relay driver 17A is driven by the fifth control signal to connect the loop switch 17B to "b" and, as a result, a communication path for the FAX is established. Henceforth, the control unit 11 controls the MODEM 19 and the image processing unit 20 to process the image information transmitted from the calling station FAX.

On the other hand, if there is no specified key input (herein, the key "0") from the calling station after transmission of the OGM message, the calling tone and the DTMF or pulse dial signal cannot be received, thus the switch 17B continues to set the loop to the first line. If the calling station transmits some voice message, the received messages are recorded on the ICM tape because the auto-answering machine continues to operate. This recording will be terminated when the calling station is hung up, (i.e. put on-hook).

Thirdly, there is considered hereinbelow the operation wherein the automatic answering machine 2 is not in answering mode but the FAX is in automatic answering mode while the calling station FAX is in manual transmission mode.

The switch means 17B continues to form the loop to the first line. Therefore, the ring signal is applied to the first line and the auto-answering machine 2 is not operated. The ring signal accompanies the −48V DC signal and the capacitor C3 eliminates this −48V DC signal to generate a signal with AC component only.

The ring signal is applied to zener diodes ZD1, ZD2 via the current limit resistor R6 and is chopped. In other words, during application of the ring signal, a positive (+) signal component signal operates the light emitting diode LD2 to turn the photo transistor PQ1 on, and a negative (−) signal component operates the light emitting diode LD1 to turn the photo transistor PQ1 on. However, the photo transistor PQ1 is turned off when the LED's LD1, LD2 are not operated at a chopping level of the back-to-back zener diodes ZD1, ZD2. The ring signal which has been transmitted through the emitter of the photo transistor PQ1 is converted into a digital signal and this digital signal is applied to the input/output unit 12. The control unit 11 acknowledges the signal as the third control signal and generates the fifth control signal if the predetermined numbers (typically two or three times) of the ring signals are detected. An operation hereafter is the same as described above.

Fourthly, hereinafter is considered the operation procedures when the telephone 1 is taken off-hook. If the telephone 1 is taken off-hook, a loop passing through the telephone 1 is established and a small current is generated in the off-hook detection coil 3A. Therefore, the contact of the off-hook detection switch 3B is switched, and the fourth control signal which is converted to logic "high" through the pull-down resistor R8 is applied to the input/output unit 12. At the same time, the control unit 11 detects the fourth control signal via the input/output unit 12 and acknowledges that the telephone is off-hook.

In addition to the above mentioned configuration, the MODEM 19 can be used to add the auto-answering machine 2 to the FAX. In general, the MODEM used in the FAX adopts IC chips which can perform not only data conversion but also tone detection and image conversion (e.g., R96MD manufactured by the Rockwell Co.).

When the MODEM which can detect the tone is used, by removing the tone detection unit 14 and DTMF detector 21 and connecting the output of the signal induction unit 13 to the receiving port of the MODEM 19 in parallel with the second line, the calling tone and the DTMF signal generated on the first line can be detected even if the loop for the second line is not established. In this case, the A/D conversion devices of the dialing detection unit 15 which detects the second control signal from the pulse type dialing signal is connected in the same manner as previously to in the output of the signal induction unit 13.

As described above, by applying an auto-answering machine to the FAX system in which the FAX and telephone are connected to one telephone line, both the FAX function of processing image information, and the auto-answering function of recording the received voice message during absence of the called party, can be implemented together.

Therefore, the telephone line can be used more efficiently and the function of the FAX can be improved, since it can perform in the receiving mode regardless of the modes or status of the telephone in the calling station FAX.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A facsimile system for receiving voice and facsimile image data calls over a single incoming telephone line, comprising:

telephone set means connected with a first line for performing a voice communication function through said first line;

auto-receiving image processing unit means connected with a second line for performing a facsimile reception function for processing facsimile image data received from a calling station facsimile system through said second line;

auto-answering telephone answering machine means connected to said first line and in parallel connection with said telephone set, for performing an auto-answering function of automatically answering incoming telephone calls upon detection of a ring signal on said first line and delivering an outgoing voice message containing information for enabling a caller to select either a facsimile receiving function or a voice message recording function of the called facsimile system;

switching unit means operably connected with said first and second lines and with an incoming telephone line, for normally connecting said incoming telephone line with said first line and, upon receipt by said switching unit of a line switching control signal, for disconnecting said incoming telephone line from said first line and connecting said incoming telephone line with said second line;

calling tone detection unit means operably connected with the first line, for generating a first control signal when a calling tone from a calling station facsimile system is detected through said first line;

dialing signal detection unit means operably connected with said first line, for generating a second control signal when a dialing signal from a caller for selecting the facsimile function of the called facsimile system is detected through said first line; and control unit means operably connected with said switching unit means, said calling tone detection unit means and said dialing signal detection unit means, for detecting the status of said first and second control signals generated by said calling tone detection unit means and said dialing signal detection unit means, respectively, and for generating said line switching control signal in accordance with the detection of either of said first and second control signals for causing said switching unit means to switch said incoming telephone line from said first line to said second line for enabling said facsimile function.

2. The facsimile system as claimed in claim 1, wherein said dialing signal detection unit means comprises:

A/D converter means for converting an input pulse dialing signal, corresponding to a key dialed by a caller using a pulse-dialing telephone set, into a digital signal and applying said digital signal to the control unit means as said second control signal; and dual tone multi-frequency detection unit means for detecting a dual tone multi-frequency dialing signal, corresponding to a key pressed by a caller using a tone dialing telephone set, and for inputting the dual tone multi-frequency dialing signal to the control unit means as said second control signal.

3. The facsimile system as claimed in claim 2, further comprising:

ring detection unit means operably connected with said first line for detecting a ring signal on said first line and for generating a third control signal when a ring signal is detected on said first line.

4. The facsimile system as claimed in claim 3, further comprising:

off-hook detection means operably connected with said first line for detecting when said telephone set means is off-hook and for generating a fourth control signal when said telephone set means is off-hook.

5. The facsimile system as claimed in claim 4, wherein said off-hook detection means comprises:

an off-hook detection switch operably connected with said control unit means, for applying said fourth control signal to said control unit means for indicating when said telephone set means is off-hook; and an off-hook detection coil operably connected in said first line and operating said off-hook detection switch by inducement of a current in said coil when said telephone set means is off-hook.

6. The facsimile system as claimed in claim 5, further comprising:

signal induction unit mean operably connected between said first line and respective signal inputs of said calling tone detection unit means and said dialing signal detection unit means for eliminating direct current components from said tone calling and dialing signals and compensating for line loss.

7. The facsimile system as claimed in claim 6, further comprising:

a relay driver operably connected with said switching unit means and driven by said line switching control signal to cause switching of said switching unit means; and an input/output unit operably connected between said control unit means and said tone calling unit means, said dialing signal detection unit means, said ring detection unit means, said off-hook detection unit, means and said relay driver, for delivering said first, second, third and fourth control signals sequentially to said control unit and for sending said line switching control signal to said relay driver.

8. A facsimile system for receiving voice and facsimile image data calls over a single incoming telephone line, comprising:

telephone set means operably connected with a first line for performing a voice communication function through said first line;

auto-receiving facsimile image data processing unit means operably connected with a second line for performing a facsimile reception function for processing image data received from a calling station facsimile system through said second line;

auto-answering telephone answering machine means, connected to said first line and in parallel with said telephone set means, and selectable to an auto-answering mode for performing an auto-answering function of automatically answering incoming telephone calls on said first line upon detection of a ring signal on said first line and for delivering an outgoing voice message containing information for enabling a caller to select either a facsimile receiving function or a voice message recording function of the called facsimile system;

switching unit means operably connected with said first and second lines and with said incoming telephone line, for normally connecting said incoming telephone line with said first line and, upon receipt by said switching unit of a line switching control signal, for disconnecting said incoming telephone line from said first line and connecting said incoming telephone line with said second line;

calling tone signal detection unit means operably connected with the first line, for detecting a calling tone received from a calling station facsimile system through said first line and for generating a first control signal upon detection of said calling tone;

dialing signal detection unit means operably connected with said first line, for detecting a dialing signal on said first line from a caller for selecting said facsimile receiving function of the called facsimile system and for generating a second control signal in accordance with detection of said dialing signal;

ring signal detection unit means operably connected with said first line, for detecting a ring signal on said first line from a calling station, when the auto-answering mode of said auto-answering telephone answering machine is not selected, and for generating a third control signal in accordance with detection of said ring signal; and control unit means operably connected with said tone detection unit means, said dialing signal detection unit means, said ring signal detection unit means and said switching unit means, for analyzing the status of the first, second and third control signals from said tone detection unit means, said dialing signal detection unit means and said ring signal detection unit means, respectively, and for generating said line switching control signal in accordance with the detection of one of said first, second and third control signals, for causing said switching unit means to switch said incoming telephone line from said first line to said second line for enabling said facsimile receiving function.

9. The facsimile system as claimed in claim 8, further comprising;

off-hook detection means operably connected with said first line and with said control unit means, for detecting when said telephone set means is off-hook and for generating a fourth control signal when said telephone set is off-hook.

10. The facsimile system as claimed in claim 9, wherein said off-hook detection means comprises:

an off-hook detecting switch operably connected with said control unit means for applying said fourth control signal to said control unit for indicating when said telephone set means is off-hook; and an off-hook detection coil operably connected in said first line, for operating said off-hook detection switch by inducement of a current in said coil when said telephone set means is off-hook.

11. The facsimile system as claimed in claim 10, further comprising:

signal induction unit means operably connected between said first line and respective signal inputs of said calling tone detection unit means and said dialing signal detection unit means for eliminating direct current components from said calling tone and dialing signals and compensating for line loss.

12. The facsimile system as claimed in claim 11, further comprising:

a relay drive operably connected with said switching unit means and driven by said line switching control signal to cause switching of said switching unit means; and an input/output unit operably connected between said control unit means and said tone calling unit means, said dialing signal detection unit means, said ring detection unit means, said off-hook detection unit means and said relay driver, for delivering said first, second, third and fourth control signals sequentially to said control unit means and for sending said line switching control signal to said relay driver.

13. A method for implementing an auto-answering function for voice and facsimile image data calls received over a single incoming telephone line in a receiving facsimile system having an automatic telephone answering machine and a telephone set connected to a first line and a facsimile image data processing unit for processing image data connected to a second line, comprising the steps of:

connecting said first line with said incoming telephone line, setting said image data processing unit of said facsimile system to an auto-receiving mode, and setting said automatic telephone answering machine to an auto-answering mode;

detecting a ring signal received on said first line from a calling station;

in response to detection of said ring signal on said first line, starting an auto-answering function of said automatic telephone answering machine for sending an outgoing message containing instructions to a caller at the calling station for enabling the caller to select between a facsimile function and a voice message transmission function of the called facsimile system, by operating said automatic telephone answering machine;

switching said incoming telephone line to said second line and processing received image data upon receipt, during operation of said auto-answering function, of a calling tone over said first line from said calling station;

switching said incoming telephone line to said second line and processing received image data upon receipt, during operation of said auto-answering function, of a dialing signal over said first line from said calling station for selecting the facsimile function of said called facsimile system; and causing the auto-answering telephone answering machine to record a voice message from the caller when no dialing signal is detected on said first line after said outgoing message is sent.

14. The method as claimed in claim 13, further comprising the step of generating a second control signal upon detection of said calling tone signal.

15. The method as claimed in claim 13, further comprising the step of generating a third control signal upon detection of said ring signal.

16. The method as claimed in claim 4, further comprising the step of generating a first control signal upon detection of said dialing signal.

17. The method as claimed in claim 13, further comprising the step of detecting an off-hook state of said telephone set and generating a fourth control signal upon detection of said off-hook state.

* * * * *

UNITED STATES PATENT AND TRADEMARK OFFICE
CERTIFICATE OF CORRECTION

PATENT NO. : 5,131,026
DATED : 14 July 1992
INVENTOR(S) : Chang-Kyu PARK

It is certified that error appears in the above-identified patent and that said Letters Patent is hereby corrected as shown below:

On the title page, item (73):

Please amend the Assignee Address to read as follows:

SamSung Electronics Co., Ltd.

Suwon, KOREA

Signed and Sealed this

Seventeenth Day of August, 1993

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,131,026
DATED : July 14, 1992
INVENTOR(S) : Chang-Kyu Park

It is certified that error appears in the above-indentified patent and that said Letters Patent is hereby corrected as shown below:

IN THE ABSTRACT

Line 9 (in the first sentence), change "answrring" to --answering--;

| | | |
|---|---|---|
| Column 3, | line 33, | after "communication", |
| | | change "unction" to --function--; |
| Column 4, | line 33, | before "Then", delete a period " . "; |
| Column 10, | line 23, | after "unit", change "mean" to --means--; |
| Column 11, | line 48, | before "switch", change "detecting" to --detection--; |
| Column 12, | line 1, | after "relay", change "drive" to --driver--. |

Signed and Sealed this

Thirteenth Day of May, 1997

Attest:

BRUCE LEHMAN

Attesting Officer

Commissioner of Patents and Trademarks